Figure 1:
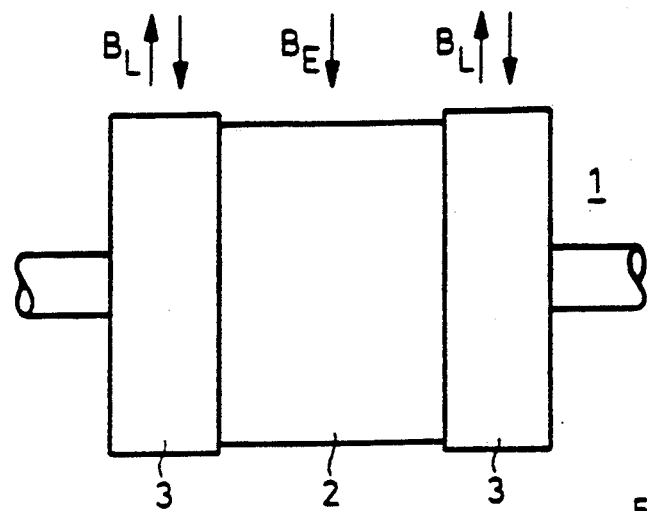

United States Patent [19]

Leitgeb

[11] Patent Number: 5,015,902

[45] Date of Patent: May 14, 1991

[54] MULTIPHASE SYNCHRONOUS PERMANENT MAGNET ELECTRIC MACHINE

[75] Inventor: Wilhelm Leitgeb, Burgthann-Mimberg, Fed. Rep. of Germany

[73] Assignee: Siemens Aktiengesellschaft, Berlin & Munich, Fed. Rep. of Germany

[21] Appl. No.: 445,686

[22] PCT Filed: Jun. 1, 1988

[86] PCT No.: PCT/DE88/00322

§ 371 Date: Dec. 4, 1989

§ 102(e) Date: Dec. 4, 1989

[87] PCT Pub. No.: WO88/10022

PCT Pub. Date: Dec. 15, 1988

[30] Foreign Application Priority Data

Jun. 4, 1987 [DE] Fed. Rep. of Germany ....... 3718983

[51] Int. Cl.⁵ .................................... H02K 21/14
[52] U.S. Cl. ............................... 310/156; 310/114; 310/181; 310/186; 310/261
[58] Field of Search ............. 310/112, 114, 156, 181, 310/185, 186, 187, 216, 261

[56] References Cited

U.S. PATENT DOCUMENTS

| | | | |
|---|---|---|---|
| 3,078,381 | 2/1963 | Volkrodt et al. | 310/156 |
| 4,099,106 | 7/1978 | Nikaido | 310/114 |
| 4,556,809 | 12/1985 | Beisse et al. | 310/114 |
| 4,656,379 | 4/1987 | McCarty | 310/181 |

FOREIGN PATENT DOCUMENTS

| | | |
|---|---|---|
| 1093475 | 11/1960 | Fed. Rep. of Germany . |
| 3204864 | 8/1983 | Fed. Rep. of Germany . |
| 3401163 | 11/1984 | Fed. Rep. of Germany . |
| 3522525 | 1/1987 | Fed. Rep. of Germany . |
| 331335 | 8/1958 | Switzerland . |
| 2125229 | 2/1984 | United Kingdom . |

Primary Examiner—Steven L. Stephan
Assistant Examiner—D. L. Rebsch
Attorney, Agent, or Firm—Kenyon & Kenyon

[57] ABSTRACT

A multiphase, synchronous, electrical machine with a permanent magnet incorporates a stator winding that is supplied with power through a static converter in such a way that, apart from the primary excitation field produced by the permanent magnets, there is an additional magnetic longitudinal field that is generated by the armature winding through which current flows, this additional longitudinal field being added to or subtracted from the primary excitation field in the longitudinal axis of the pole, and in which there are permanent magnets arranged within the winding-free rotor, as well as soft magnetic materials with intervening spaces of non-magnetic material which form loops that lie within each other and that are open towards the air gap, enclosing the air gap. The rotor is divided into at least two differently constructed sections that lie axially one behind the other, of which only the first section is provided with permanent magnets and the open loops of soft-magnetic material, and the second section has the loops of soft-magnetic material, located within each other, each of which is arranged over a part of the pole covering and is open to the air gap, to control the additional magnetic longitudinal field produced by the armature winding, wherein these longitudinal fields are separated by non-magnetic material.

5 Claims, 1 Drawing Sheet

U.S. Patent     May 14, 1991     5,015,902

MULTIPHASE SYNCHRONOUS PERMANENT MAGNET ELECTRIC MACHINE

A multiphase, synchronous, electrical machine that is excited by a permanent magnet, incorporating a stator winding that is supplied with power through a static converter in such a way that apart from the primary excitation field produced by the permanent magnets there is an additional magnetic longitudinal field that is generated by the armature winding through which current flows, this additional longitudinal field being added to or subtracted from the primary excitation field in the magnets arranged within the winding-free rotor, as well as soft magnetic materials with intervening spaces of non-magnetic material which form loops that lie within each other and that are open towards the air gap, these enclosing the pole gap.

An electrical machine of this kind, excited by permanent magnets, which can be altered in the field, is known from DE-OS 34 01 163, in particular from FIGS. 10 and 11, and from pages 17 and 18. The known machine is based on a flow-concentration arrangement (collector configuration). The permanent magnets—which extend in a radial direction--each lie in a pole gap, and the pole is divided into two part poles by a central gap. The connection between the permanent magnets that are perpendicular to the gap between the part poles in their direction of flow and the air gap at the stator is achieved through a laminar soft-iron pole arrangement with interposed non-magnetic spaces. These soft iron laminations that are of steel that is magnetically conductive or of several layers of dynamo or core sheet, thus form loops that are located one within the other and are open to the air gap, and these enclose the pole gap in which the permanent magnet is located - which extends in a radial direction across all the soft-iron laminations and thereby interrupts the loop. The pole gap is formed in that the permanent magnet and the innermost loop of soft-iron laminations are at a distance from the air gap, the width of the pole gap being such that the excitation flux required for the magnetic longitudinal field that is to be superposed and that is additionally generated by the stator, is available. For this reason it must correspond to at least one groove division of the stator winding.

Because of this special constructive configuration of the rotor of the known electrical rotating machine that is excited by a permanent magnet, the basic excitation field for a specific degree of excitation is produced esclusively wattless from the permanent magnets, whereas higher and lower densities can be made available with the assistance of the armature excitation. This additional longitudinal magnetic field, generated by the stator, is superposed on the basic excitation field with variable signs and amounts. Thus the field of the machine with permanent-magnet excitation can be varied by this means. However, due to the flux concentration construction, considerable restrictions of the effectiveness of this known arrangement are caused by both the magnet resistance that is decisive for the stator longitudinal field because of the transverse arrangement of the permanent magnets to the magnetic longitudinal axis and the remaining armature cross field, and thus the cost for static converters or static frequency changers is relatively high.

For this reason, it is the task of the present invention to improve a multiphase electrical machine of this kind, which is excited by permanent magnet, with the possibility of field regulation (field attenuation) quantitatively so as to arrive at a higher field regulation range or so as to reduce expenditures for static converters or static frequency changers.

In order to solve this problem, in a multiphase electrical machine that is excited by permanent magnet, of the type described in the introduction hereto, according to the present invention the rotor is divided into at least two differently constructed sections that lie axially one behind the other, of which only the first section is provided with permanent magnets and the open loops of soft-magnetic material, and the other, second section has the loops of soft-magnetic material, located within each other, each of which is arranged over a part of the pole covering and is open to the air gap, to control the additional magnetic longitudinal field produced by the armature winding, wherein these longitudinal fields are separated by non-magnetic material.

A spatial superpositioning of the two fields is avoided by this division of the rotor into sections that lie axially one behind the other, of which the first section controls the constant basic excitation flux $B_E$ of the machine that is generated by the permanent magnets, and the other, second section, which can be varied in respect of sign and size, controls the superposed longitudinal field $B_L$. For this reason, one can dimension and configure both fields differently, each alone in respect of the field that is predominant within it. The spatial separation of the two sections can be used in machines with a flux concentration arrangement as well as in machines with an air gap magnet arrangement. This means, on the one hand, that the magnetic resistance that governs the magnetic longitudinal field $B_L$ that is to be superposed is reduced by the fraction of the permanent magnets and, on the other hand, it creates the possibility of limiting the armature reaction—which is particularly critical at large field regulation ranges—in the area of the basic excitation field $B_E$ that is excited by permanent magnet, by means of a suitably large air gap. Furthermore, because of the spatial separation of the sections, the saturation effect can be exploited in the second section with the magnetic longitudinal field, whereby the effect of the armature reaction can be further reduced. This means a reduction of the expenditures required for electronics to supply the stator winding.

Control of the magnetic field is improved by the loops of soft magnetic material that lie within each other in the first and second section of the rotor, which enclose the pole gaps, and are open to the air gap; and for the same magnetic resistance in the direction of the longitudinal axis, magnetic resistance in the direction of the transverse axis is increased.

It is particularly advantageous if the first section, which incorporates the permanent magnets, be arranged within the rotor and lies between two of the other second sections. This means that the other, second section, which controls the additional magnetic longitudinal field $B_L$, is in each instance directly adjacent to the bearings of the rotor shaft, i.e., in an area in which the rotor shaft flexes very little. This means that in this way one can select a small magnetic and mechanical air gap in this area, or increase the rotational speed of the rotor without increasing the risk of oscillations such as those that can occur as a result of unequal magnetic attraction as caused, for example, by production tolerances.

In addition to the foregoing, one can also achieve a further reduction of the effect of armature reaction by a different selection of the pole covering, such that this is greater in the first section with the permanent magnets than in the second section.

Figure 2:
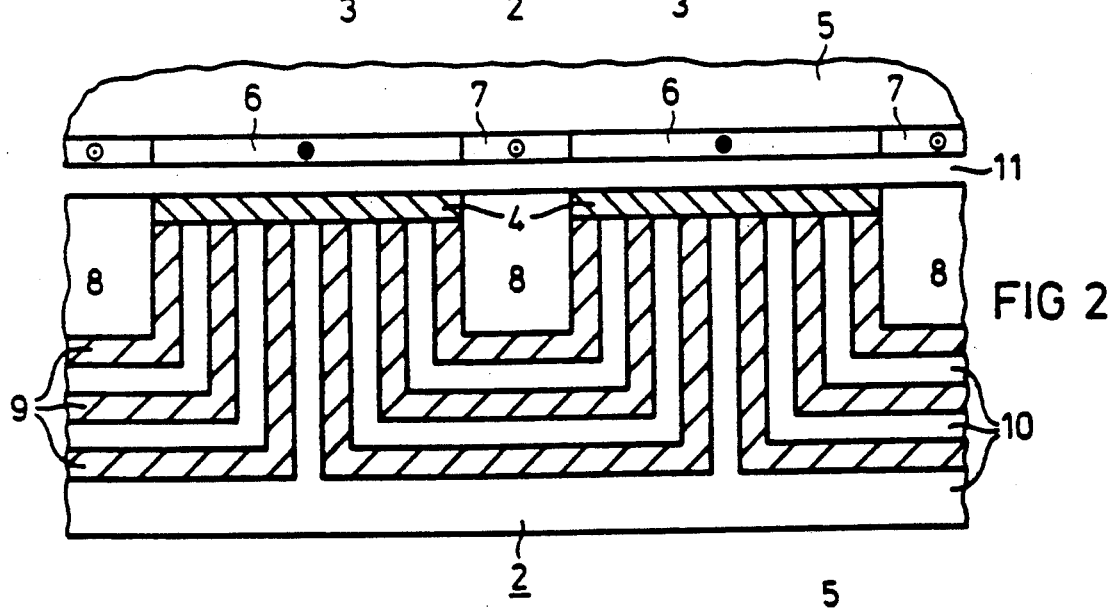
Figure 3:
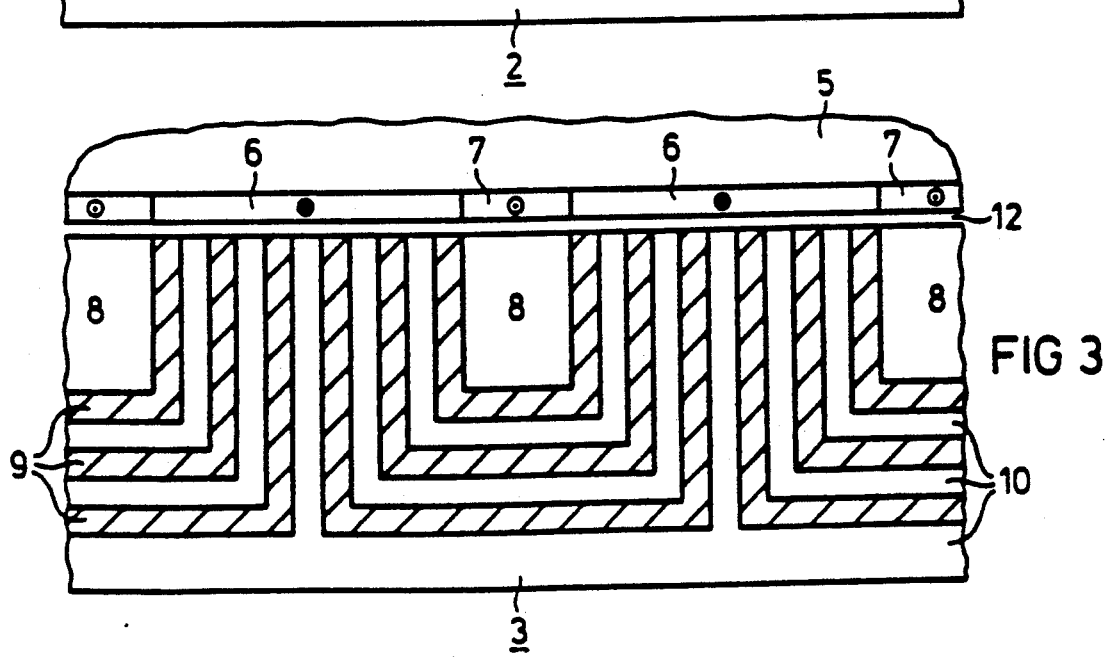

The present invention is described in greater detail below on the basis of the embodiment shown in FIGS. 1 to 3. These drawings show the following: FIG. 1: A schematic view of a rotor of an electrical [rotating] machine that is excited by permanent magnet, said rotor extending in a longitudinal direction; FIGS. 2, 3: The principle of the construction of the rotor, in radial cross-section, in a developed view.

The rotor 1, which has no windings, of a synchronous electrical machine that is excited by permanent magnet, such as is used, for example, to drive a machine tool or a vehicle at a high rotational speed, is made up of two sections 2 and 3 that lie axially one behind the other, of which only the first section 2 is fitted with permanent magnets 4 and thus controls the basic excitation field $B_E$. What is involved here is machine with an air gap magnet arrangement. This first section 2, which is fitted with permanent magnets 4 is arranged centrally and lies between two other second sections 3, each of which is approximately one half the length of the section 2. The construction of the first section 2 is shown in FIG. 2, whereas FIG. 3 shows the construction of the other second section 3, which correspond, apart from the permanent magnets 4. The schematic representations shown in FIGS. 2 and 3 are distorted, because they show the circular circumference of the rotor as a straight line, i.e., they are developed or laid out views of the rotor. Furthermore, the section 2 in FIG. 2 and section 3 shown in FIG. 3 are schematic only, and are shown on a greatly enlarged scale from the scale of FIG. 1 for purposes of clarity.

The stator 5 of the synchronous, [rotating]electrical machine, which is excited by permanent magnet, is shown only schematically in FIGS. 2 and 3. It has a multiphase stator winding that lies in grooves and is supplied with square-wave current from a controlled static converter or pulse inverter (not shown herein). For the sake of simplicity, FIGS. 2 and 3 show only the ampere-turns per cm, of which one ampere-turns per cm 6, identified by a cross within a circle, corresponds to the ampere-turns per cm of the conductors lying above the pole shoe, each of which in section 2 is opposite a permanent magnet 4 or, in section 3, is opposite the laminated pole, whereas the other ampere-turns per cm 7, identified by a dot within a circle, corresponds to the conductors that are located above the pole gaps 8. The width of these pole gaps 8 is so selected that the ampere-turns cm 7 results in the desired excitation flux to control the total field of the machine.

In the first section 2 and in the sections 3, the pole gap 8 is surrounded in each instance by loops 9 of soft magnetic material that are positioned inside each other and are open towards the stator 5. These serve to control the flux and are laminated, e.g., from curved steel sheet. Between them are corresponding loops 10 of non-magnetic material that also fill the pole gaps 8. This means that each pole has a central gap that is filled with non-magnetic material.

In the first section 2 the soft-magnetic loops 9 end at the permanent magnets 4. The magnetic air gap for the basic excitation field $B_E$ thus results from the thickness of the permanent magnets 4 and the air gap 11, in which there are non-magnetic straps (not shown herein) that hold the permanent magnets 4 to the rotor body. The magnetic resistance that is thus effective in the direction of the transverse axis is relatively large in this first section 2 corresponding to the magnetic air gap to the stator 5. Contrary to this, in another second section 3, which is of identical construction with respect to the arrangement of the soft magnetic loops 9 and the non-magnetic loops 10, the mechanical air gap 12, which corresponds to the magnetic air gap, is much smaller.

As is indicated by the arrows in FIG. 1, the first section 2 or the rotor 1 controls the basic excitation field $B_E$, whereas, essentially, the other second section 3 conducts the additional magnetic longitudinal field $B_L$—which serves to regulate the field—that is magnetized from the stator ampere-turns per cm 7 and can be varied by size and sign by the appropriate control of the stator currents. In section 2, on the one hand, the magnetic longitudinal resistance itself is slight for air gap inductions of up to 1.2 Tesla because of the loops 9 of soft magnetic material, whereas on the other hand the armature reaction (transverse magnetisation) is greatly suppressed by the large magnetic air gap. As a consequence of the significantly smaller air gap 12 in section 3 on a small stator ampere-turns per cm 7 is needed even for greater field regulation ranges, so that the size of the pole gap 8 can be kept small and thus a high pole covering is possible for the machine.

On the whole, with this machine a larger field regulation range and correspondingly a higher rotational speed regulation range is possible for relatively low expenditures for magnetic material and static converter elements, together with their control systems.

I claim:

1. A multiphase, synchronous electrical machine excited by permanent magnets, having a stator winding and a rotor, the permanent magnets generating a basic excitation field and electrical current flowing through the stator winding generating an additional magnetic field in a radial direction, said additional magnetic field being added to or subtracted from the basic excitation field in the radial direction, said permanent magnets being disposed in the rotor, said rotor being free of windings, soft magnetic material with intervening spaces of nonmagnetic material forming groups of loops nested within each other in the rotor, the loops being exteriorly open towards an air gap disposed between the stator winding and rotor, said groups of nested loops each enclosing a pole gap disposed at a circumferential surface of the rotor substantially centered in each nested loop group, the rotor being divided into at least two sections arranged axially, said first section being provided with said permanent magnets with said loops of soft magnetic material terminating at said permanent magnets, said second section having loops of soft magnetic material arranged such that said loops are open to the air gap between the stator winding and the rotor, said loops in said second section being nested within each other with nonmagnetic material being provided between said loops, said loops in said second section being provided to control the additional magnetic field generated by the stator winding.

2. The multiphase electrical rotating machine recited in claim 1, wherein the first section is disposed between two of said second sections.

3. The multiphase electrical rotating machine recited in claim 1, wherein the permanent magnets in the first section are disposed so as to be adjacent to the air gap.

4. The multiphase electrical rotating machine recited in claim 1, wherein the air gap between the stator winding and the second section is smaller than the air gap between the stator winding and the first section.

5. The multiphase electrical rotating machine recited in claim 1, wherein an extent of said first section in a longitudinal direction of the rotor is greater than an extent of the second section in the longitudinal direction.

* * * * *